US010967586B2

(12) United States Patent
Guzman et al.

(10) Patent No.: US 10,967,586 B2
(45) Date of Patent: Apr. 6, 2021

(54) RADIUS FILLERS FOR COMPOSITE STRUCTURES, COMPOSITE STRUCTURES THAT INCLUDE RADIUS FILLERS, AND SYSTEMS AND METHODS OF FORMING THE SAME

(71) Applicant: The Boeing Company, Chicago, IL (US)

(72) Inventors: Juan C. Guzman, Seattle, WA (US); Robert L. Anderson, Tacoma, WA (US); Douglas A. McCarville, Orting, WA (US)

(73) Assignee: The Boeing Company, Chicago, IL (US)

( * ) Notice: Subject to any disclaimer, the term of this patent is extended or adjusted under 35 U.S.C. 154(b) by 800 days.

(21) Appl. No.: 15/438,481

(22) Filed: Feb. 21, 2017

(65) Prior Publication Data

US 2017/0157867 A1 Jun. 8, 2017

Related U.S. Application Data

(62) Division of application No. 13/567,450, filed on Aug. 6, 2012, now Pat. No. 9,616,594.

(51) Int. Cl.
*B29C 70/52* (2006.01)
*B29D 99/00* (2010.01)
(Continued)

(52) U.S. Cl.
CPC ............ *B29C 70/528* (2013.01); *B29B 11/16* (2013.01); *B29C 70/52* (2013.01); *B29C 70/526* (2013.01);
(Continued)

(58) Field of Classification Search
CPC ....... B29C 65/70; B29C 53/36; B29C 44/326; B29C 70/521; B29C 70/526;
(Continued)

(56) References Cited

U.S. PATENT DOCUMENTS

| 4,113,910 A | 9/1978 | Loyd |
| 4,440,593 A | 4/1984 | Goldsworthy |

(Continued)

FOREIGN PATENT DOCUMENTS

| CN | 101959674 | 1/2011 |
| EP | 2610165 | 7/2013 |

(Continued)

OTHER PUBLICATIONS

Remi Blanc et al., "Fiber orientation measurements in composite materials," 37 (2) Compos. Part A Appl. Sci. Manuf., 197-206 (2006).

(Continued)

*Primary Examiner* — Michael N Orlando
*Assistant Examiner* — Christopher W Raimund
(74) *Attorney, Agent, or Firm* — Dascenzo Gates Intellectual Property Law, P.C.

(57) ABSTRACT

Radius fillers for composite structures, composite structures that include the radius fillers, and systems and methods of forming the radius fillers. The systems and methods may be configured to create a pre-form that may be utilized to form a radius filler and/or to create a radius filler from the pre-form. The systems may include an apparatus configured to form the pre-form for the radius filler. This apparatus includes a composite tape source, a pre-forming structure, and a drive mechanism. The systems also may include an apparatus configured to form the radius filler. This apparatus includes a pre-form supply, a first radius filler die, a second radius filler die, and a die selection structure.

20 Claims, 4 Drawing Sheets

(51) Int. Cl.
    *B29B 11/16*    (2006.01)
    *B29L 31/30*    (2006.01)

(52) U.S. Cl.
    CPC .. *B29D 99/0021* (2013.01); *B29L 2031/3076* (2013.01); *Y02T 50/40* (2013.01); *Y10T 156/17* (2015.01)

(58) Field of Classification Search
    CPC ....... B29C 70/386; B29C 70/52; B29C 43/22; B29C 70/528; B29C 65/00; B29B 11/16; B29B 11/12; B29B 11/02; B29L 2031/3076; Y02T 50/43; Y10T 156/17; B29D 99/00; B29D 99/0021; B32B 1/06; B64C 3/18; B64C 1/06; B64F 5/00; C09J 5/06
    See application file for complete search history.

(56) References Cited

U.S. PATENT DOCUMENTS

| | | | |
|---|---|---|---|
| 4,559,005 | A | 12/1985 | Gants et al. |
| 4,789,594 | A | 12/1988 | Stawski |
| 4,919,739 | A | 4/1990 | Dyksterhouse et al. |
| 5,026,447 | A | 6/1991 | O'Connor |
| 5,192,383 | A | 3/1993 | Cavin |
| 5,268,050 | A | 12/1993 | Azari |
| 5,556,496 | A | 9/1996 | Sumerak |
| 5,639,535 | A | 6/1997 | McCarville |
| 5,948,472 | A | 9/1999 | Lawrie |
| 6,500,370 | B1 | 12/2002 | Belvin et al. |
| 6,562,436 | B2 | 5/2003 | George et al. |
| 6,689,448 | B2 | 2/2004 | George et al. |
| 6,709,538 | B2 | 3/2004 | George et al. |
| 6,800,164 | B2 | 10/2004 | Brandstrom |
| 7,534,319 | B2 | 5/2009 | Mead et al. |
| 7,987,885 | B2 | 8/2011 | Zhou et al. |
| 8,101,107 | B2 | 1/2012 | Brown et al. |
| 8,211,530 | B2 | 7/2012 | Mead et al. |
| 8,591,685 | B2 | 11/2013 | Anderson et al. |
| 8,815,036 | B2 | 8/2014 | Nitsch |
| 9,073,272 | B2 | 7/2015 | Blot et al. |
| 9,643,395 | B2 | 5/2017 | Kline et al. |
| 2002/0031641 | A1* | 3/2002 | George ..................... B32B 5/12 428/105 |
| 2005/0023728 | A1* | 2/2005 | Benson ................. B29C 70/504 264/258 |
| 2005/0048273 | A1* | 3/2005 | Ryan ..................... B29O 44/322 428/297.4 |
| 2007/0116941 | A1 | 5/2007 | Brown et al. |
| 2007/0175573 | A1 | 8/2007 | Fox et al. |
| 2008/0053599 | A1 | 3/2008 | Aijima |
| 2011/0048624 | A1 | 3/2011 | Nitsch |
| 2013/0149521 | A1 | 6/2013 | Nelson et al. |
| 2014/0034236 | A1 | 2/2014 | Guzman et al. |
| 2015/0283764 | A1 | 10/2015 | McCarville et al. |

FOREIGN PATENT DOCUMENTS

| | | |
|---|---|---|
| JP | S 48-23154 | 7/1973 |
| JP | H 01-208147 | 8/1989 |
| JP | H 04-299110 | 10/1992 |
| JP | 2013-530855 | 8/2013 |
| RU | 2415750 | 4/2011 |
| WO | WO 01/62495 | 8/2001 |
| WO | WO 2011/001080 | 1/2011 |

OTHER PUBLICATIONS

Machine generated English translation of abstract for CN 10195974 downloaded from Espacenet.com on Apr. 22, 2016.
Machine generated English translation of abstract for WO 2011/001080 downloaded from Espacenet.com on Apr. 22, 2016.
Machine generated English language translation of abstract for JP 2013-530855, downloaded from Espacenet.com dated Jun. 22, 2017.
Machine generated English language translation of abstract for RU 2415750, downloaded from Espacenet.com on May 31, 2017.
English language translation of abstract for JPH 04-299110.
Machine generated English language translation of abstract for JPH 01-208147, downloaded from Espacenet.com on Jun. 22, 2017.
Machine generated English language translation of abstract for JPS 48-23154, downloaded from Espacenet.com on Jun. 22, 2017.
Japanese Patent Office, Notice for Reasons of Rejection for related Japanese patent application 2013-162514, Apr. 11, 2017.
English translation of Japanese Patent Office Notice for Reasons of Rejection for Japanese patent application 2013-162514, Apr. 11, 2017.
Federal Institute of Industrial Property, Office Action of the Substantive Examination for Russian patent application 2013130322/11(045236), Mar. 22, 2017.
English translation of Russian Office Action of the Substantive Examination for Russian patent application 2013130322/11(045236), Mar. 22, 2017.

* cited by examiner

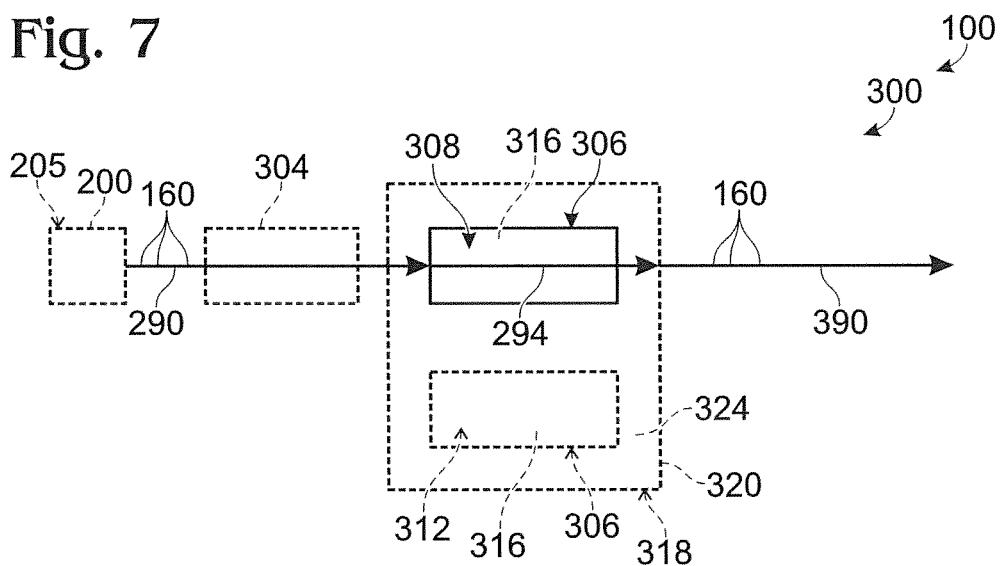
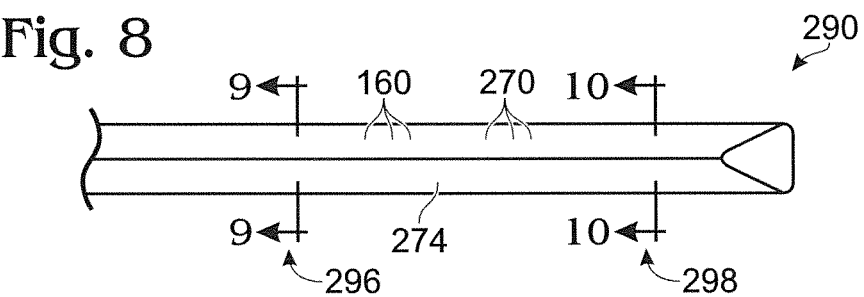
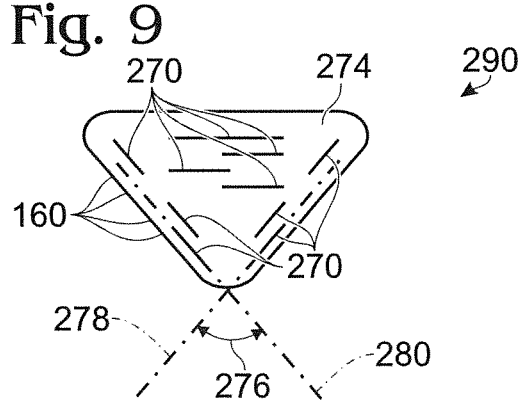
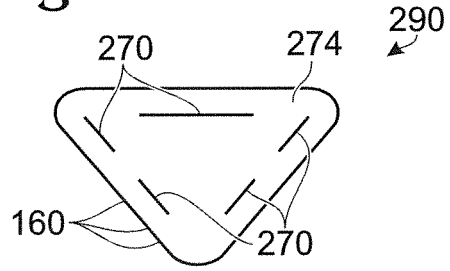
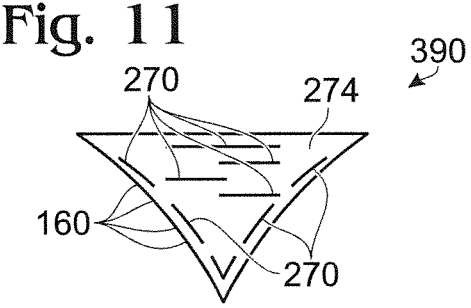
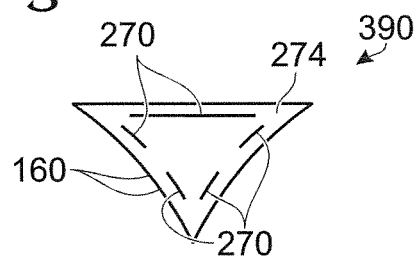

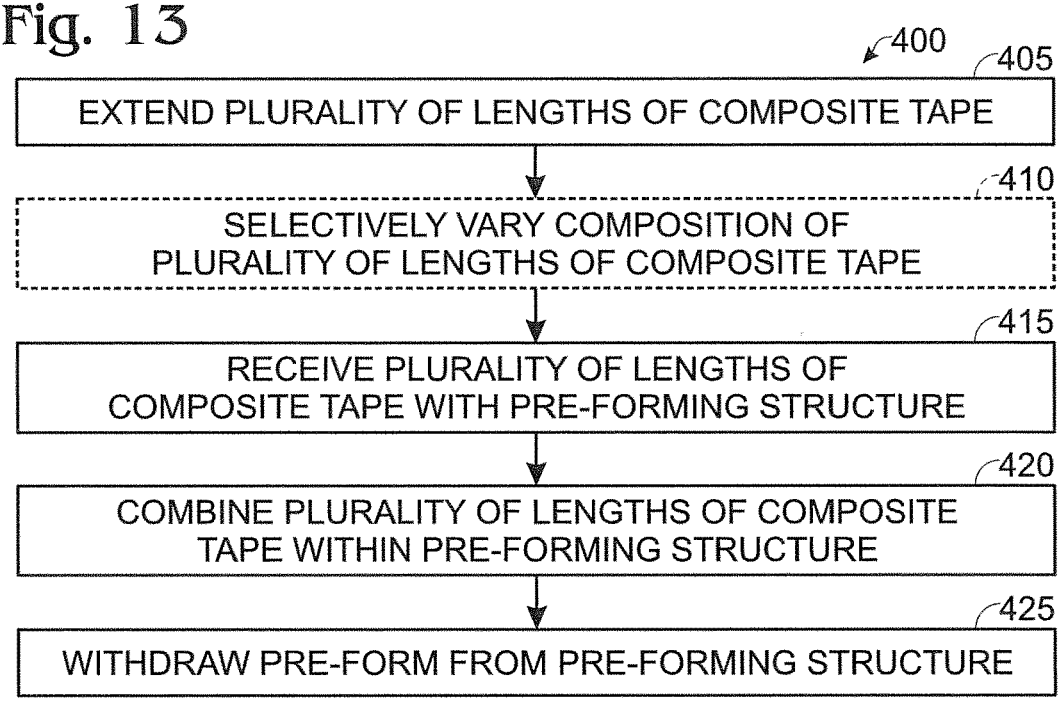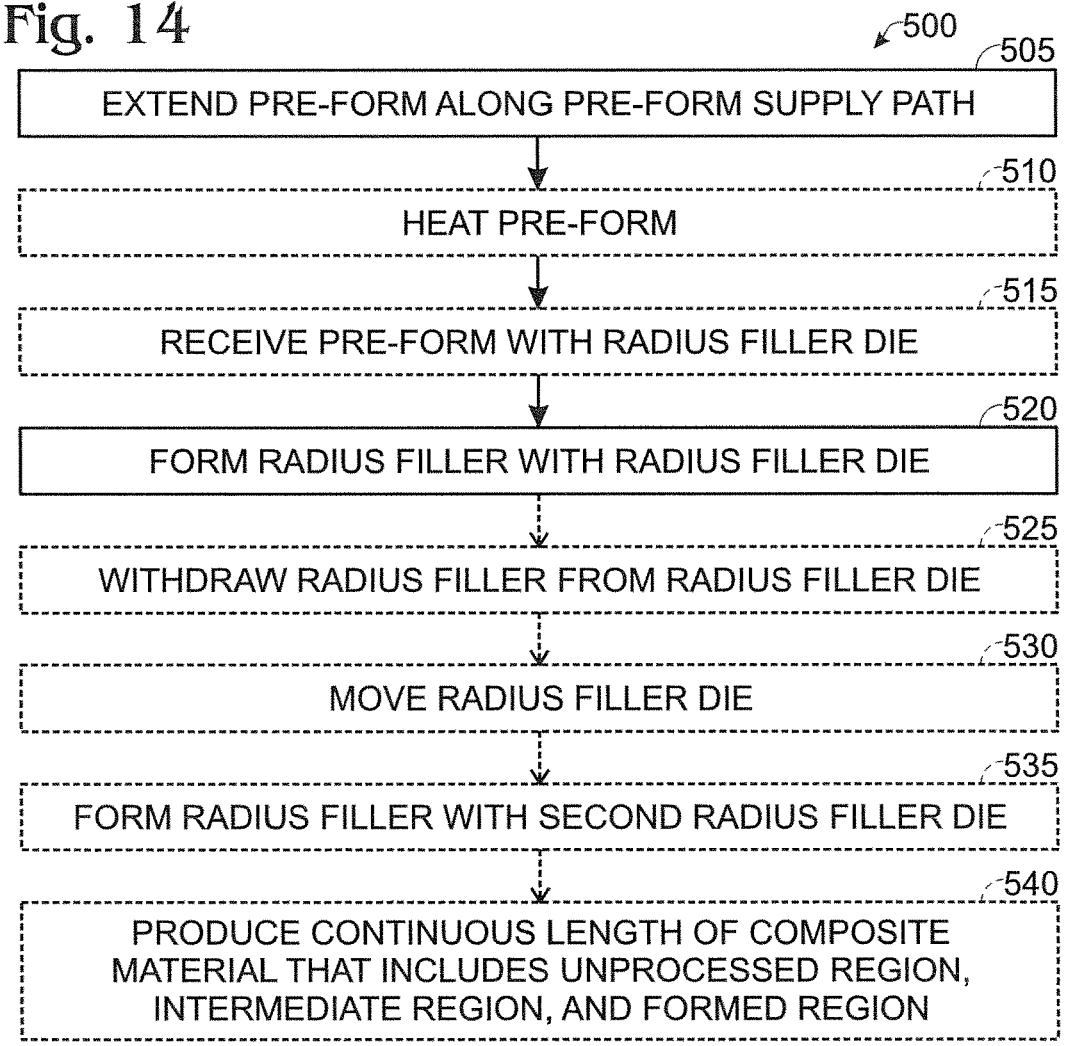

RADIUS FILLERS FOR COMPOSITE STRUCTURES, COMPOSITE STRUCTURES THAT INCLUDE RADIUS FILLERS, AND SYSTEMS AND METHODS OF FORMING THE SAME

RELATED APPLICATION

This application is a divisional of, and claims priority under 35 USC § 121 to, U.S. patent application Ser. No. 13/567,450, entitled "RADIUS FILLERS FOR COMPOSITE STRUCTURES, COMPOSITE STRUCTURES THAT INCLUDE RADIUS FILLERS, AND SYSTEMS AND METHODS OF FORMING THE SAME," and filed on Aug. 6, 2012.

FIELD

The present disclosure relates generally to radius fillers that may be utilized to fill cavities in composite structures and more specifically to composite structures that include the radius fillers and/or to systems and methods of forming the radius fillers.

BACKGROUND

Composite structures often include a laminate structure in which sheets of a composite material, such as a prepreg material, may be bent, wrapped, and/or otherwise extended between a first plane, or surface, and a second plane, or surface. The finite thickness and mechanical stiffness of the sheets of composite material result in a finite bend, or radius of curvature, in a transition region between the first surface and the second surface and, in some geometries, this finite radius of curvature results in a void space, or cavity, between adjacent sheets of composite material.

Generally, this void space is filled with, or otherwise occupied by, a filler material, such as a radius filler. The radius filler may be configured to provide mechanical support to the sheets of composite material that are proximal thereto and/or decrease a potential for distortion of the sheets of composite material while the composite structure is curing. While the presence of the radius filler may provide a variety of benefits to the composite structure, differences between a geometry, cross-sectional shape, or transverse cross-sectional shape of the radius filler when compared to a geometry, cross-sectional shape, or transverse cross-sectional shape of the void space may distort the composite structure during formation and/or curing of the composite structure. Thus, it may be desirable to closely match the shape of the radius filler to a shape, or a desired shape, of the void space. In addition, it also may be desirable to match the mechanical properties of the radius filler to that of the sheets of composite material and/or the resultant composite structure, thereby improving the overall durability of the composite structure.

Traditional systems and methods for radius filler construction are highly labor intensive, are batch processes, require the use of jigs that are as long as the radius filler that is to be produced and thus utilize a large amount of floor space, do not produce a radius filler with a geometry that is well matched to the geometry of the void space, do not provide for control of the mechanical stiffness of the radius filler, and/or are inherently wasteful and produce a significant amount of scrap material. As composite structures become larger and more complex, these limitations become increasingly significant, increasing the costs associated with composite structure construction. As an illustrative, non-exclusive example, next-generation aircraft may utilize composite structures that are approximately 10 meters in diameter, 33 meters long, and include 1000 or more lengths of radius filler, which also may be referred to herein as noodles. Thus, there exists a need for improved radius fillers for composite structures, as well as for improved systems and methods for fabricating the radius fillers.

SUMMARY

Radius fillers for composite structures, composite structures that include the radius fillers, and systems and methods of forming the radius fillers are disclosed herein. The systems and methods may be configured to create a pre-form that may be utilized to form a radius filler and/or to create a radius filler from the pre-form.

The systems may include an apparatus configured to form the pre-form for the radius filler. This apparatus includes a composite tape source, which is configured to provide a plurality of lengths of composite tape, and a pre-forming structure, which is configured to receive the plurality of lengths of composite tape and to converge the plurality of lengths of composite tape to produce the pre-form. This apparatus also includes a drive mechanism, which is configured to convey the plurality of lengths of composite tape between the composite tape source and the pre-forming structure.

The systems also may include an apparatus configured to form the radius filler. This apparatus includes a pre-form supply, which is configured to supply a pre-form along a pre-form supply path. This apparatus also includes a first radius filler die, which is configured to be selectively located within the pre-form supply path, to receive the pre-form, and to produce a first region of the radius filler with a first cross-sectional shape therefrom. This apparatus further includes a second radius filler die, which is configured to be selectively located within the pre-form supply path, to receive the pre-form, and to produce a second region of the radius filler with a second cross-sectional shape therefrom. This apparatus also includes a die selection structure, which is configured to selectively locate the first radius filler die within the pre-form supply path to produce the first region and to selectively locate the second radius filler die within the pre-form supply path to produce the second region.

BRIEF DESCRIPTION OF THE DRAWINGS

FIG. 7 is a schematic representation of illustrative, non-exclusive examples of a radius filler forming apparatus according to the present disclosure.

FIG. 8 is a less schematic but still illustrative, non-exclusive example of a pre-form according to the present disclosure that includes a first region and a second region.

FIG. 9 is a transverse cross-sectional view of the first region of the pre-form of FIG. 8 taken along lines 9-9.

FIG. 10 is a transverse cross-sectional view of the second region of the pre-form of FIG. 8 taken along lines 10-10.

FIG. 11 is a schematic representation of an illustrative, non-exclusive example of a transverse cross-sectional view of a first portion of a radius filler that is formed from the first region of the pre-form of FIG. 8.

FIG. 12 is a schematic representation of an illustrative, non-exclusive example of a transverse cross-sectional view of a second portion of a radius filler that is formed from the second region of the pre-form of FIG. 8.

FIG. 13 is a flowchart depicting methods according to the present disclosure of creating a pre-form.

FIG. 14 is flowchart depicting methods according to the present disclosure of creating a radius filler.

DESCRIPTION

Figure 1:
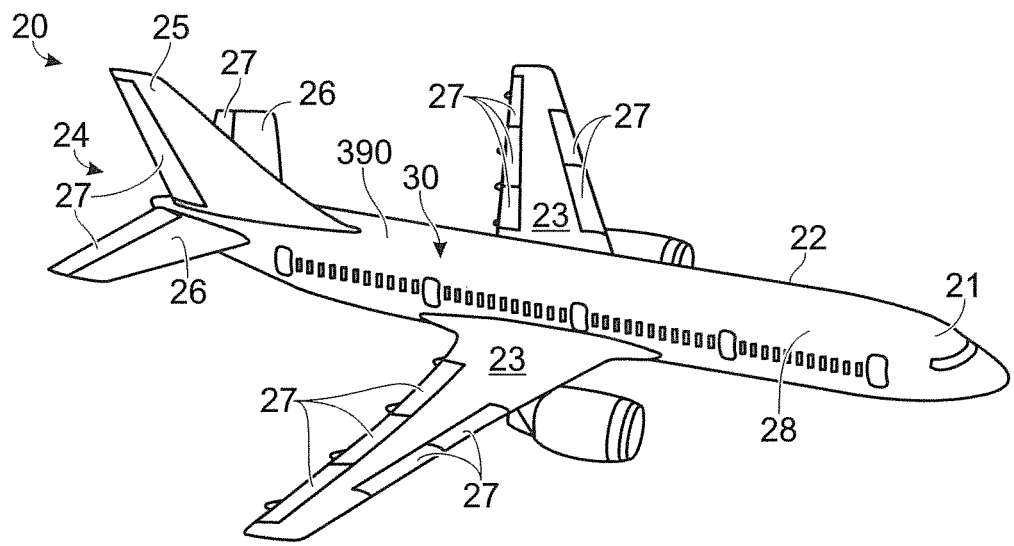
FIG. 1 is a schematic representation of an illustrative, non-exclusive example of an aircraft that may include one or more composite structures that may utilize radius fillers according to the present disclosure.

FIGS. 1-12 provide illustrative, non-exclusive examples of radius fillers according to the present disclosure; assemblies, apparatus, and/or pre-forms that may be utilized to form the radius fillers according to the present disclosure; and/or composite structures that may include the radius fillers according to the present disclosure. In FIGS. 1-12, like reference numerals are utilized to designate like components and may not be discussed in detail herein with respect to each Figure. Similarly, each component may not be explicitly labeled in each Figure; and any component and/or feature that is discussed herein with reference to any one of FIGS. 1-12 may be utilized with any other of FIGS. 1-12 without departing from the scope of the present disclosure. In addition, the embodiments depicted in FIGS. 1-12 provide illustrative, non-exclusive examples of radius fillers, assemblies, apparatus, pre-forms and/or composite structures according to the present disclosure and radius fillers, assemblies, apparatus, pre-forms, and/or composite structures according to the present disclosure are not limited to the illustrated embodiments.

FIG. 1 is a schematic representation of an illustrative, non-exclusive example of an aircraft 20 that may include one or more composite structures 30 that may utilize radius fillers 390 according to the present disclosure. Aircraft 20 may include any suitable aircraft that may include, utilize, and/or otherwise be formed from one or more composite structures 30, and composite structures 30 may form any suitable portion of aircraft 20. As illustrative, non-exclusive examples, composite structures 30 may form any suitable portion of a cockpit 21, fuselage 22, wings 23, tail 24, vertical stabilizer 25, horizontal stabilizers 26, control surfaces 27, and/or interior 28 of aircraft 20.

Figure 2:
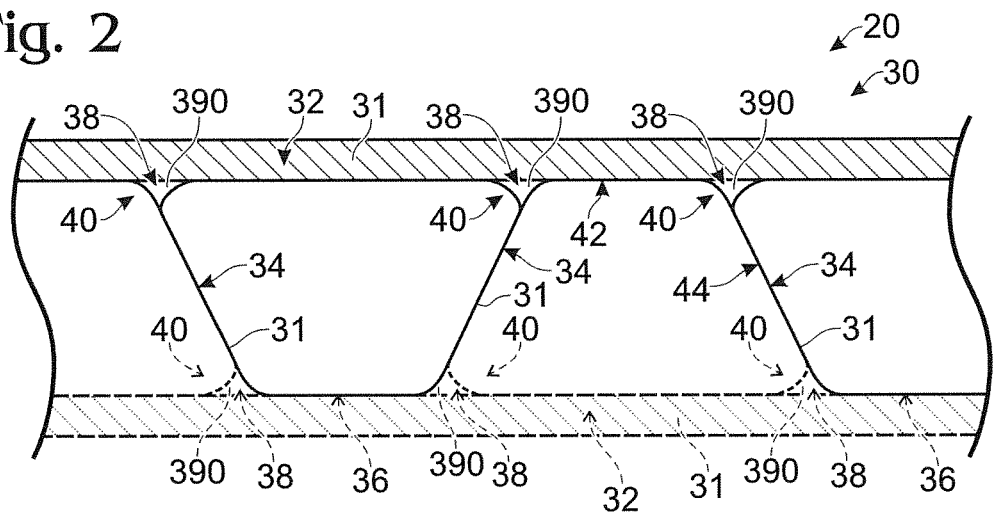
FIG. 2 is a schematic representation of illustrative, non-exclusive examples of a composite structure according to the present disclosure.

Similarly, composite structures 30 may include any suitable form, an illustrative, non-exclusive example of which is shown in FIG. 2. The composite structure of FIG. 2 includes a skin 32 and a plurality of webs 34, each of which may be formed from one or more sheets of composite material 31. Composite structures 30 may include a single skin 32, with a plurality of hat stiffeners 36 that are formed from webs 34. However, and as illustrated in dashed lines in FIG. 2, composite structures 30 also may include two skins 32, with webs 34 extending therebetween.

Regardless of the specific construction of composite structures 30, the formation of skins 32 and/or webs 34 from sheets of composite material 31 may provide for the formation of voids 38 within a transition region 40 between skins 32 and webs 34 and/or in any suitable transition region 40 between a first plane, or surface, 42 and a second plane, or surface, 44. As discussed, voids 38 may be filled with, or otherwise occupied by, a radius filler 390, and a shape of and/or one or more mechanical properties of radius filler 390 may impact a shape of and/or one or more mechanical properties of composite structures 30.

Figure 3:
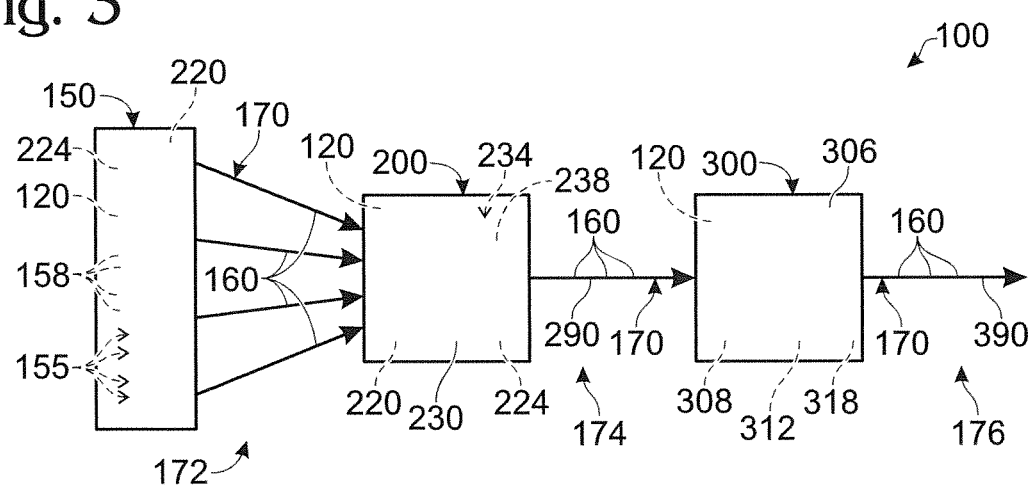
FIG. 3 is a schematic representation of illustrative, non-exclusive examples of a radius filler production assembly according to the present disclosure.

FIG. 3 is a schematic representation of illustrative, non-exclusive examples of a radius filler production assembly 100 according to the present disclosure. Radius filler production assembly 100 includes a composite tape source 150, which may provide a plurality of lengths of composite tape 160 to a pre-forming apparatus 200, which includes a pre-forming structure 230 that receives the plurality of lengths of composite tape 160 and produces a pre-form 290 therefrom. Pre-form 290 may be received by a radius filler forming apparatus 300, which may produce a radius filler 390 therefrom.

In operation, and as discussed in more detail herein, radius filler production assembly 100 may be configured to concurrently extend the plurality of lengths of composite tape 160 from composite tape source 150, receive the plurality of lengths of composite tape 160 with pre-form forming apparatus 200, produce pre-form 290 with pre-form forming apparatus 200, extend pre-form 290 from pre-form forming apparatus 200, receive pre-form 290 with radius filler forming apparatus 300, produce radius filler 390 within radius filler forming apparatus 300, and/or extend radius filler 390 from radius filler forming apparatus 300 for use in a downstream process, such as in fabrication of a suitable composite structure 30. Thus, and as illustrated in FIG. 3, radius filler production assembly 100 may be configured to produce a continuous length of composite material 170 that includes an unprocessed region 172, which includes the plurality of lengths of composite tape 160, an intermediate region 174, which includes pre-form 290, and a formed region 176, which includes radius filler 390.

Figure 4:
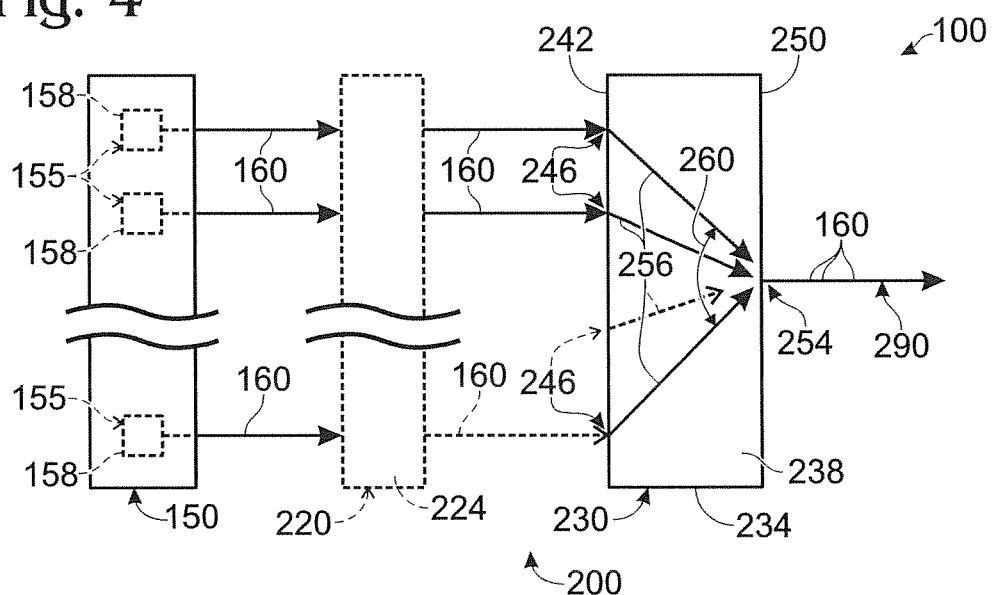
FIG. 4 is a schematic representation of illustrative, non-exclusive examples of a pre-form forming apparatus according to the present disclosure.

Both composite tape source 150 and pre-forming apparatus 200 are illustrated in more detail in FIG. 4. Pre-forming structure 230 is illustrated in more detail in FIGS. 4-6, with FIG. 4 providing a schematic view of the pre-forming structure and FIGS. 5-6 providing less schematic but still illustrative, non-exclusive examples of a first side 242 of the pre-forming structure and a second side 250 of the pre-forming structure, respectively. Radius filler forming apparatus 300 is illustrated in more detail in FIG. 7.

Composite tape source 150 may include any suitable structure that is configured to provide the plurality of lengths of composite tape 160 to pre-form forming apparatus 200. As shown in FIGS. 3 and 4, composite tape source 150 may include and/or be a single composite tape source that produces the plurality of lengths of composite tape 160. However, it is within the scope of the present disclosure that composite tape source 150 may include and/or be a plurality of composite tape sources, such as a plurality of composite tape dispensers 155 and/or a plurality of rolls 158 of composite tape 160.

Composite tape source 150 and/or pre-form forming apparatus 200 may include and/or be utilized with a composite tape selection structure 220, as illustrated in FIGS. 3-4. Composite tape selection structure 220 may include any suitable structure that is configured to selectively supply the plurality of lengths of composite tape 160 to pre-forming structure 230 based, at least in part, on any suitable selection criteria, which also may be referred to herein as controlling a composition of the plurality of lengths of composite tape 160 that are supplied to pre-forming structure 230.

As illustrative, non-exclusive examples, composite tape selection structure 220 may be configured to selectively increase a number of lengths of composite tape 160 that comprise the plurality of lengths of composite tape 160, selectively decrease the number of lengths of composite tape 160, and/or selectively change a composition of at least one of the plurality of lengths of composite tape 160. Illustrative, non-exclusive examples of selection criteria according to the present disclosure include a desired cross-sectional area for radius filler 390, a desired cross-sectional shape of radius filler 390, a desired mechanical stiffness of radius filler 390, and/or a desired shape of a radius filler die 306 that is configured to form pre-form 290 into radius filler 390 within radius filler forming apparatus 300.

As used herein, the term "desired" may indicate a form, state, shape, and/or property that is, or approximates, a previously determined form, state, shape, and/or property. With this in mind, a desired form, state, shape, and/or property also may be referred to herein as a selected form, state, shape, and/or property; a target form, state, shape, and/or property; a predetermined form, state, shape, and/or property; and/or a predefined form, state, shape, and/or property. As an illustrative, non-excusive example, the desired cross-sectional shape of radius filler 390 may include a predetermined cross-sectional shape that corresponds to a cross-sectional shape of voids 38 of FIG. 2.

Composite tape selection structure 220 may utilize any suitable mechanism to selectively control the composition of the plurality of lengths of composite tape 160. As an illustrative, non-exclusive example, composite tape selection structure 220 may include one or more mechanical actuators that may be controlled manually, electronically, pneumatically, and/or hydraulically. As another illustrative, non-exclusive example, composite tape selection structure 220 may include and/or be in communication with a controller 224 that is programmed to control the operation thereof. As an illustrative, non-exclusive example, controller 224 may be programmed to increase the number of lengths of composite tape 160 responsive to an increase, or a desired increase, in the cross-sectional area of radius filler 390. As another illustrative, non-exclusive example, controller 224 may be programmed to decrease the number of lengths of composite tape 160 responsive to a decrease, or a desired decrease, in the cross-sectional area of radius filler 390. As yet another illustrative, non-exclusive example, controller 224 may be programmed to substitute a first length of composite tape 160 for a second length of composite tape 160 responsive to a change in a desired mechanical stiffness of radius filler 390.

It is within the scope of the present disclosure that composite tape source 150 may be separate and/or distinct from pre-forming apparatus 200. However, it is also within the scope of the present disclosure that pre-forming apparatus 200 may include composite tape source 150.

Figure 5:
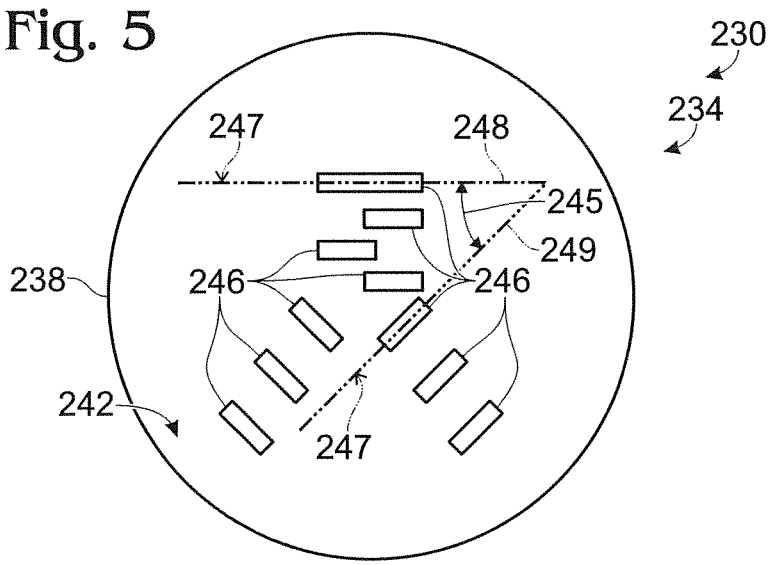
FIG. 5 is a less schematic but still illustrative, non-exclusive example of a first side of a pre-forming structure according to the present disclosure.
Figure 6:
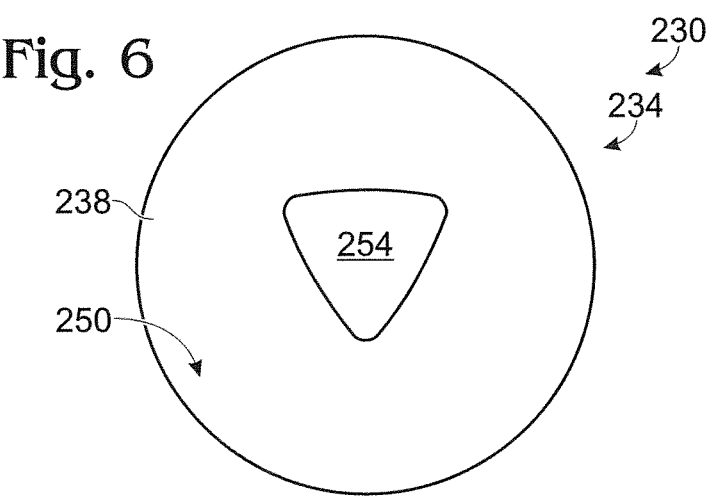
FIG. 6 is a less schematic but still illustrative, non-exclusive example of a second side of a pre-forming structure according to the present disclosure.

Pre-forming structure 230 may include any suitable structure that is configured to receive the plurality of lengths of composite tape 160 and to produce pre-form 290 therefrom. As an illustrative, non-exclusive example, pre-forming structure 230 may include and/or be a pre-form die 234. As illustrated in FIG. 4-6, pre-form die 234 may include a die body 238 that includes a plurality of first openings 246 on a first side 242 thereof and a second opening 254 on a second side 250 thereof. First openings 246 may converge into second opening 254 within die body 238 via a plurality of channels 256 within die body 238, as shown in FIG. 4.

Pre-form die 234 may be configured to receive the plurality of lengths of composite tape 160 at first openings 246 and to converge the plurality of lengths of composite tape 160 therein, thereby producing pre-form 290 at second opening 254. Pre-form 290 may be configured to be withdrawn from second opening 254 and, as discussed in more detail herein, may subsequently be utilized in the formation of radius filler 390.

It is within the scope of the present disclosure that pre-form die 234 may include and/or define any suitable configuration and/or geometry. As an illustrative, non-exclusive example, and as illustrated in FIG. 4, first side 242 may be opposed to, or generally opposed to, second side 250. As another illustrative, non-exclusive example, and as also illustrated in FIG. 4, the plurality of first openings may be configured to converge into the second opening at a convergence angle 260, which also may be referred to herein as a maximum convergence angle. Illustrative, non-exclusive examples of convergence angles 260 according to the present disclosure include convergence angles 260 of less than 70 degrees, less than 65 degrees, less than 60 degrees, less than 55 degrees, less than 50 degrees, less than 45 degrees, less than 40 degrees, less than 35 degrees, less than 30 degrees, less than 25 degrees, less than 20 degrees, or less than 15 degrees.

The plurality of first openings 246 may define any suitable shape, illustrative, non-exclusive examples of which include rectangular, rectilinear, and/or liner openings (as shown in FIG. 5). Similarly, second opening 254 also may define any suitable shape, illustrative, non-exclusive examples of which include a triangular shape, a wedge shape, and/or a shape that defines a base and a plurality of convergingly angled sides (as shown in FIG. 6).

It is within the scope of the present disclosure that the plurality of first openings 246 may include any suitable number of first openings that may be configured to receive any suitable number of lengths of composite tape 160. Illustrative, non-exclusive examples of the number of first openings 246 within die body 238 and/or the number of lengths of composite tape 160 that are included within pre-form 290 include at least 2, at least 4, at least 6, at least 8, at least 10, at least 12, at least 14, at least 16, at least 18, at least 20, at least 25, or at least 30 first openings 246 and/or lengths of composite tape 160.

It is also within the scope of the present disclosure that each of the plurality of first openings 246 may be oriented at any suitable angle with respect to a remainder of the plurality of first openings 246. As an illustrative, non-exclusive example, and as shown in FIG. 5, first openings 246 may define a major opening axis 247 that is parallel to a width of each of the first openings 246. As also shown in FIG. 5, a first major opening axis 248 that is associated with one of the plurality of first openings 246 may be oriented at a skew opening angle 245 with respect to a second major opening axis 249 that is associated with another of the plurality of first openings 246. Illustrative, non-exclusive examples of skew opening angles 245 according to the present disclosure include skew opening angles of at least 5 degrees, at least 10 degrees, at least 15 degrees, at least 20 degrees, at least 25 degrees, at least 30 degrees, at least 35 degrees, at least 40 degrees, or at least 45 degrees, as well as skew opening angles of less than 90 degrees, less than 85 degrees, less than 80 degrees, less than 75 degrees, less than 70 degrees, less than 65 degrees, less than 60 degrees, less than 55 degrees, less than 50 degrees, or less than 40 degrees. Additionally or alternatively, and as also shown in FIG. 5, at least one of the plurality of first openings 246 may include a major opening axis 247 that is at least substantially parallel to a major opening axis of another of the plurality of first openings 246.

Pre-form die 234 may be formed and/or constructed from any suitable material using any suitable method of construction. As illustrative, non-exclusive examples, pre-form die 234 may be formed from one or more of a polymeric material, a resin material, a polymeric resin, an epoxy, and/or a metallic material. As additional illustrative, non-exclusive examples, pre-form die 234 and/or first openings 246 and/or second openings 254 thereof may be constructed by machining, photolithography, and/or 3-dimensional printing.

Radius filler forming apparatus 300 may include any suitable structure, such as a forming region 318, that is configured to receive pre-form 290 and to produce radius filler 390 therefrom. Illustrative, non-exclusive examples of radius filler forming apparatus 300 are shown in FIG. 3 and illustrated in more detail in FIG. 7. As shown in FIG. 7, pre-form 290 may be supplied to radius filler forming apparatus 300 along a pre-form supply path 294 from any suitable pre-form supply 205, which also may be referred to herein as a pre-form source (such as pre-form forming apparatus 200 and/or another source of pre-form 290). Radius filler forming apparatus 300 includes at least one radius filler die 306 that is located within pre-form supply path 294 and is configured to receive pre-form 290 and to produce radius filler 390 therefrom.

Radius filler forming apparatus 300 may include any suitable number of radius filler die 306, with each of the radius filler die 306 being configured be selectively located within pre-form supply path 294. As an illustrative, non-exclusive example, and as shown in FIG. 7, radius filler forming apparatus 300 may include a first radius filler die 308 and a second radius filler die 312, together with a die selection structure 320. Die selection structure 320 may be configured to selectively locate first radius filler die 308 within pre-form supply path 294 to produce a first region of radius filler 390 that includes a first cross-sectional shape and to selectively locate second radius filler die 312 within pre-form supply path 294 to produce a second region of radius filler 390 that includes a second cross-sectional shape.

As discussed in more detail herein, radius filler production assembly 100 and/or composite tape selection structure 220 thereof may be configured to selectively vary the number and/or composition of the plurality of lengths of composite tape 160 that are included in pre-form 290 and/or radius filler 390 that may be produced therefrom. It is within the scope of the present disclosure that die selection structure 320 may be configured to and/or may be controlled by a controller 324 that is programmed to selectively locate first radius filler die 308 and/or second radius filler die 312 within pre-form supply path 294 based upon any suitable die selection criteria, illustrative, non-exclusive examples of which include the number and/or composition of the plurality of lengths of composite tape 160 that are included within a particular portion of pre-form 290 and/or any suitable selection criteria, illustrative, non-exclusive examples of which are discussed in more detail herein with reference to composite tape selection structure 220.

As indicated in dashed lines in FIG. 7, radius filler forming apparatus 300 further may include and/or be in thermal communication with one or more pre-heaters 304 that are configured to pre-heat pre-form 290 prior to pre-form 290 being received by forming region 318 and/or radius filler die 306 thereof. Additionally or alternatively, and as also indicated in dashed lines in FIG. 7, radius filler die 306 may include and/or be in thermal communication with one or more die heaters 316 that are configured to heat radius filler die 306 and that may, directly or indirectly, heat pre-form 290. Illustrative, non-exclusive examples of pre-heaters 304 and/or die heaters 316 according to the present disclosure include any suitable convective heater, conductive heater, radiant heater, infrared lamp, electrical heater, and/or combustion heater.

Composite tape 160 and/or the plurality of lengths thereof may include any suitable structure that may be utilized within radius filler production assembly 100 and/or utilized to produce pre-form 290 and/or radius filler 390. As an illustrative, non-exclusive example, composite tape 160 may include a composite construction that includes a reinforcing fiber matrix that is coated, encapsulated, and/or otherwise covered by a resin material and also may be referred to herein as a prepreg material. Illustrative, non-exclusive examples of reinforcing fiber matrices according to the present disclosure include a plurality of reinforcing fibers that may be formed from any suitable material, illustrative, non-exclusive examples of which include carbon, titanium, aluminum, glass, and/or a metallic material. Illustrative, non-exclusive examples of the resin material include an epoxy material and/or a polymeric material.

It is within the scope of the present disclosure that the reinforcing fiber matrix and/or the plurality of reinforcing fibers thereof may be configured in any suitable orientation and/or relative orientation. As an illustrative, non-exclusive example, a longitudinal axis of a portion, a majority, and/or all of the plurality of reinforcing fibers may be at least substantially parallel and/or parallel to a fiber axis. Similarly, radius filler 390 may define a radius filler longitudinal axis, and the fiber axis may be parallel to and/or oriented at any suitable fiber angle with respect to the radius filler longitudinal axis. Illustrative, non-exclusive examples of fiber angles according to the present disclosure include fiber angles of at least 5 degrees, at least 10 degrees, at least 15 degrees, at least 20 degrees, at least 25 degrees, at least 30 degrees, at least 35 degrees, at least 40 degrees, or at least 45 degrees, as well as fiber angles of less than 85 degrees, less than 80 degrees, less than 75 degrees, less than 70 degrees, less than 65 degrees, less than 60 degrees, less than 55 degrees, less than 50 degrees, or less than 40 degrees.

As another illustrative, non-exclusive example, a portion of the plurality of reinforcing fibers may be oriented in a 2-dimensional arrangement, illustrative, non-exclusive examples of which include any suitable mesh, woven structure, cloth and/or random 2-dimensional array of reinforcing fibers. As yet another illustrative, non-exclusive example, a portion of the plurality of reinforcing fibers may be oriented in a 3-dimensional arrangement, illustrative, non-exclusive examples of which include a mesh, a woven structure, a cloth, a random 3-dimensional array of reinforcing fibers, and/or a collection of two or more 2-dimensional arrangements of reinforcing fibers that are stacked on top of one another.

As shown in dashed lines in FIG. 3, composite tape 160, pre-form 290, and/or radius filler 390 may be in mechanical communication with a drive mechanism 120. Additionally or alternatively radius filler production assembly 100, composite tape source 150, pre-form forming apparatus 200, and/or radius filler forming apparatus 300 may include drive mechanism 120. Drive mechanism 120 may be configured to convey the plurality of lengths of composite tape 160 between composite tape source 150 and pre-form forming apparatus 200, to convey pre-form 290 between pre-form forming apparatus 200 and radius filler forming apparatus 300, to extend the plurality of lengths of composite tape 160 from composite tape source 150, to extend pre-form 290 from pre-form forming apparatus 200, and/or to extend radius filler 390 from radius filler forming apparatus 300.

Drive mechanism 120 may include any suitable structure. As illustrative, non-exclusive examples, drive mechanism 120 may include any suitable motor, roller, squeeze roller assembly, and/or conveyor that is configured to push, pull, and/or otherwise propel the plurality of lengths of composite tape 160, pre-form 290, and/or radius filler 390 within and/or from any suitable portion of radius filler production assembly 100 and/or any suitable component thereof.

FIGS. 8-10 provide illustrative, non-exclusive examples of a pre-form 290 that may be formed using the systems and methods according to the present disclosure, while FIGS. 11-12 provide illustrative, non-exclusive examples of a radius filler 390 that may be formed from pre-form 290 of FIGS. 8-10. As shown in FIG. 8, pre-form 290 includes a cross-sectional shape that is at least substantially similar to a shape of second opening 254 of FIG. 6, though it is within the scope of the present disclosure that second opening 254 may include any suitable shape and/or be configured to produce pre-form 290 with any suitable cross-sectional shape.

Pre-form 290 of FIG. 8 includes a first region 296 and a second region 298 that are formed from a plurality of lengths of composite tape 160 that include a plurality of reinforcing fiber matrices 270 and one or more resin materials 274. FIG. 9 illustrates a transverse cross-sectional view of pre-form 290 taken within first region 296 and along line 9-9 of FIG. 8, while FIG. 10 illustrates a transverse cross-sectional view of pre-form 290 taken within second region 298 and along line 10-10 of FIG. 8. As illustrated in FIGS. 9 and 10 and discussed in more detail herein, first region 296 is formed from a larger number of lengths of composite tape 160 and includes a larger number of reinforcing fiber matrices 270 than second region 298.

In addition, FIGS. 9-10 also illustrate that, as a result of the orientation of first openings 246 of FIG. 5, at least one of the plurality of lengths of composite tape 160 (and/or a major axis 278 of reinforcing fiber matrix 270 thereof) may be arranged at a skew angle 276 with respect to another of the plurality of lengths of composite tape 160 (and/or a major axis 280 of reinforcing fiber matrix 270 thereof). Illustrative, non-exclusive examples of skew angles 276 according to the present disclosure are discussed in more detail herein with reference to skew opening angle 245 of FIG. 5. Additionally or alternatively, and as also discussed with reference to first openings 246, at least a portion of the plurality of lengths of composite tape 160 (and/or a major axis of reinforcing fiber matrix 270 thereof) may be arranged to be at least substantially parallel to one another.

As discussed with reference to FIGS. 4-6, the plurality of lengths of composite tape 160 may converge upon one another within pre-forming structure 230 and/or pre-form die 234. It is understood that this convergence may compress, deform, and/or otherwise change a shape of at least a portion of the plurality of lengths of composite tape 160, may produce a reinforcing fiber matrix that is not completely planar when viewed in transverse cross-section (such as in FIGS. 9-10), and/or may redistribute resin material 274 among the plurality of lengths of composite tape 160 and/or within pre-form 290.

Thus, FIGS. 9-10 provide a schematic and/or simplified representation of the actual structure of the plurality of lengths of composite tape 160 within pre-form 290. Regardless, and as discussed, the systems and methods disclosed herein may be configured to produce a pre-form 290 and/or a radius filler 390 that includes a plurality of lengths of composite tape 160, wherein at least one of the plurality of lengths of composite tape 160 (and/or a major axis of reinforcing fiber matrix 270 thereof) is not parallel to at least one other of the plurality of lengths of composite tape 160 (and/or a major axis of reinforcing fiber matrix 270 thereof).

This ability to orient the plurality of lengths of composite tape 160 at any suitable relative angle and/or orientation within pre-form 290 (and/or radius filler 390 that is formed therefrom), together with the discussed control over the number and/or composition of the plurality of lengths of composite tape 160 that are present within pre-form 290 may provide for greater control and/or flexibility with regard to the final shape and/or mechanical properties of radius filler 390 that is produced therefrom. As illustrative, non-exclusive examples, this may provide for elimination of an adhesive wrap that might otherwise be applied to an outer surface of radius filler 390 to account for discrepancies between a shape of radius filler 390 and a shape of a cavity that may be filled by radius filler 390, may provide for the formation of sharper corners on radius filler 390 when compared to more conventional radius filler fabrication techniques, may provide for the use of radius filler 390 that includes a cross-sectional shape that is equal to, or at least substantially equal to, a cross-sectional shape of the cavity, and/or may provide for the use of a radius filler that includes less overfill when compared to conventional radius fillers (such as less than 10%, less than 8%, less than 6%, less than 4%, or less than 2% overfill).

Returning to FIGS. 8-10, and as discussed, pre-form 290 may include and/or define any suitable transverse cross-sectional shape, illustrative, non-exclusive examples of which include any suitable triangular transverse cross-sectional shape, wedge-shaped transverse cross-sectional shape, and/or a transverse cross-sectional shape that defines a base and a plurality of convergingly angled sides. Formation of pre-form 290 as an intermediate to the formation of radius filler 390 may decrease a force needed to create pre-form 290 and/or radius filler 390 and/or may decrease gumming and/or wear of radius filler die 306 that is utilized to create radius filler 390 when compared to a process that produces a radius filler directly from a composite tape without formation of an intermediate structure, such as pre-form 290.

Each of the plurality of lengths of composite tape 160 that is included within pre-form 290 may include and/or define any suitable tape length and/or tape width. As an Illustrative, non-exclusive example, at least a portion of the plurality of lengths of composite tape 160 may include a tape length of at least 1 meter (m), at least 2 m, at least 3 m, at least 4 m, at least 5 m, at least 6 m, at least 7 m, at least 8 m, at least 9 m, at least 10 m, at least 15 m, or at least 20 m, as well as a tape length of less than 50 m, less than 40 m, less than 30 m, less than 25 m, less than 20 m, less than 15 m, less than 10 m, or less than 5 m. As another illustrative, non-exclusive example, at least a portion of the plurality of lengths of composite tape 160 may include a tape width of at least 3 millimeters (mm), at least 4 mm, at least 5 mm, at least 6 mm, at least 7 mm, at least 8 mm, at least 9 mm, at least 10 mm, at least 11 mm, at least 12 mm, at least 14 mm, at least 16 mm, at least 18 mm, at least 20 mm, or at least 24 mm, as well as a tape width of less than 50 mm, less than 45 mm, less than 40 mm, less than 35 mm, less than 30 mm, less than 25 mm, less than 20 mm, less than 18 mm, less than 16 mm, less than 14 mm, less than 12 mm, less than 10 mm, less than 8 mm, less than 6 mm, or less than 4 mm. Illustrative, non-exclusive examples of the portion of the plurality of lengths of composite tape 160 include one length of composite tape, two lengths of composite tape, three lengths of composite tape, at least 25% of the plurality of lengths of composite tape, at least 50% of the plurality of composite tape, at least 75% of the plurality of lengths of composite tape, or 100% of the plurality of lengths of composite tape.

As discussed, FIGS. 11-12 are schematic representations of illustrative, non-exclusive examples of transverse cross-sectional views of a radius filler 390 that is formed from pre-form 290 of FIGS. 8-10, with FIG. 11 providing a transverse cross-sectional view of first region 296 of pre-form 290 from FIG. 8 and FIG. 12 providing a transverse cross-sectional view of second region 298 of pre-form 290 from FIG. 9. FIGS. 11 and 12 illustrate that a portion of radius filler 390 that may be formed from first region 296 of pre-form 290 of FIGS. 8-10 may include a different cross-sectional shape, cross-sectional area, and/or number of lengths of composite tape 160 than a portion of radius filler 390 that is formed from second region 298 of pre-form 290. This may provide for production of a radius filler 390 that includes a cross-sectional shape and/or one or more mechanical properties that may vary along a length thereof, thereby providing more flexibility in the formation of radius filler 390 and/or the construction of a composite structure that may be formed therewith.

FIGS. 13-14 are flowcharts that represent illustrative, non-exclusive examples of methods according to the present disclosure. In FIGS. 13-14, some steps are illustrated in dashed boxes indicating that such steps may be optional or may correspond to an optional version of a method according to the present disclosure. That said, not all methods according to the present disclosure are required to include the steps illustrated in solid boxes. In addition, the methods and steps illustrated in FIGS. 13-14 are not limiting and other methods and/or steps are within the scope of the present disclosure, including methods having greater than or fewer than the number of steps illustrated, as understood from the discussions herein.

FIG. 13 is a flowchart depicting methods 400 according to the present disclosure of creating a pre-form. Methods 400 include extending a plurality of lengths of composite tape at 405 and may include selectively varying a composition of the plurality of lengths of composite tape at 410. Methods 400 further include receiving the plurality of lengths of composite tape in a pre-forming structure at 415, combining the plurality of lengths of composite tape within the pre-forming structure at 420 to form a pre-form, and/or withdrawing the pre-form from the pre-forming structure at 425.

Extending the plurality of lengths of composite tape at 405 may include conveying the plurality of lengths of composite tape from a composite tape source. Illustrative, non-exclusive examples of composite tape sources according to the present disclosure are discussed in more detail herein.

Selectively varying the composition of the plurality of lengths of composite tape at 410 may include selectively varying at least one of a width of at least one of the plurality of lengths of composite tape, a relative orientation of at least one of the plurality of lengths of composite tape with respect to at least one other of the plurality of lengths of composite tape, a material of construction of at least one of the plurality of lengths of composite tape, an orientation of a reinforcing fiber matrix that is included in at least one of the plurality of lengths of composite tape, and/or a number of lengths of composite tape that is included in the plurality of lengths of composite tape. It is within the scope of the present disclosure that the selectively varying may include selectively varying based on any suitable criteria, illustrative, non-exclusive examples of which include a desired cross-sectional area of a radius filler that is formed from the pre-form, a desired cross-sectional shape of the radius filler that is formed from the pre-form, and/or a desired mechanical stiffness of the radius filler that is formed from the pre-form.

As an illustrative, non-exclusive example, the selectively varying may include selectively increasing the number of lengths of composite tape to increase the cross-sectional area of the radius filler that is formed from the pre-form and/or to change the mechanical stiffness of the radius filler that is formed from the pre-form. As another illustrative, non-exclusive example, the selectively varying also may include decreasing the number of lengths of composite tape to decrease the cross-sectional area of the radius filler that is formed from the pre-form and/or to change the mechanical stiffness of the radius filler that is formed from the pre-form. It is within the scope of the present disclosure that the selectively varying may be performed concurrently with the extending at 405, the receiving at 415, the combining at 420, and/or the withdrawing at 425.

Receiving the plurality of lengths of composite tape with the pre-forming structure at 415 may include drawing and/or conveying the plurality of lengths of composite tape into the pre-forming structure. As an illustrative, non-exclusive example, the receiving may include drawing the plurality of lengths of composite tape through a plurality of first openings that are present on a first side of the pre-forming structure and/or conveying the plurality of lengths of composite tape along, or within, a plurality of channels within the pre-forming structure.

Combining the plurality of lengths of composite tape within the pre-forming structure at 420 may include combining the plurality of lengths of composite tape to produce and/or form the pre-form. As an illustrative, non-exclusive example, the combining may include arranging at least a first portion of the plurality of lengths of composite tape so that it is oriented in a plane that is not parallel to a second portion of the plurality of lengths of composite tape and/or such that it is oriented in a plane that is arranged at a skew angle with respect to a plane that is defined by, or parallel to, a second portion of the plurality of lengths of composite tape.

As another illustrative, non-exclusive example, the combining may include converging the plurality of lengths of composite tape upon one another to form the pre-form. It is within the scope of the present disclosure that the converging may include converging within the pre-forming structure and/or converging within a pre-form die of the pre-forming structure. As yet another illustrative, non-exclusive example, the converging may include contacting a first length of composite tape with a second length of composite tape.

Withdrawing the pre-form from the pre-forming structure at 425 may include conveying and/or removing the pre-form from the pre-forming structure. As an illustrative, non-exclusive example, the withdrawing may include extending the pre-form from a second opening on a second side of the pre-forming structure. It is within the scope of the present disclosure that the withdrawing may be performed concurrently and/or simultaneously with the extending at 405, the selectively varying at 410, the receiving at 415, and/or the combining at 420.

FIG. 14 is a flowchart depicting methods 500 according to the present disclosure of creating a radius filler. Methods 500 include extending a pre-form along a pre-form supply path at 505 and may include heating the pre-form at 510 and/or receiving the pre-form within a radius filler die at 515. Methods 500 further include forming the radius filler with the radius filler die at 520 and may include withdrawing the radius filler from the radius filler die at 525, moving the radius filler die at 530, forming the radius filler with a second radius filler die at 535, and/or producing a continuous length of composite material that includes an unprocessed region, an intermediate region, and a formed region at 540.

Extending the pre-form along the pre-form supply path at 505 may include drawing, pushing, pulling, propelling, and/or otherwise conveying the pre-form into, toward, and/or through the radius filler die, through a radius filler forming apparatus that includes the radius filler die, and/or through a forming region that includes the radius filler die. Additionally or alternatively, the extending also may include extending the pre-form from a pre-form forming apparatus and/or another pre-form source, illustrative, non-exclusive examples of which are discussed in more detail herein, and/or creating the pre-form using methods 400.

Heating the pre-form at 510 may include heating any suitable portion of the pre-form and/or heating any suitable portion of a radius filler production assembly that is configured to form the pre-form and/or utilize the pre-form to form a radius filler. As illustrative, non-exclusive examples, the heating may include heating the pre-form prior to the forming at 520 and/or 535, heating the pre-form during the forming at 520 and/or 535, heating the pre-form prior to receiving the pre-form with the radius filler die at 515, supplying a radiant heat to the pre-form, and/or heating the radius filler die. It is within the scope of the present disclosure that the heating may include heating the pre-form to any suitable pre-form temperature, illustrative, non-exclusive examples of which include pre-form temperatures of at least 35° C., at least 40° C., at least 45° C., at least 50° C., at least 55° C., at least 60° C., at least 65° C., or at least 70° C.

Receiving the pre-form within the radius filler die at 515 may include receiving the pre-form at a first side of the radius filler die. Forming the radius filler with the radius filler die at 520 may include compacting the pre-form, removing a void from the pre-form, removing an air pocket from the pre-form, changing a shape of the pre-form, and/or shaping the pre-form to produce the radius filler. This may include producing a radius filler that defines a different transverse cross-sectional shape than a transverse cross-sectional shape of the pre-form and/or producing a radius filler that includes a different, or smaller, transverse cross-sectional area than a transverse cross-sectional area of the pre-form.

Withdrawing the radius filler from the radius filler die at 525 may include withdrawing the radius filler from a second side of the radius filler die that is different from, or opposed to, the first side of the radius filler die. It is within the scope of the present disclosure that the forming may be performed concurrently with the extending at 505, the heating at 510, the receiving at 515, the forming at 520, the withdrawing at 525, the moving at 530, the forming at 535, and/or the producing at 540.

Moving the radius filler die at 530 may include moving the radius filler die, which also may be referred to herein as a first radius filler die, out of the pre-form supply path and moving a second radius filler die into the pre-form supply path. When methods 500 include the moving at 530 and the forming at 535, the forming at 520 may include forming the radius filler with the first radius filler die to produce a first region of the radius filler that defines a first cross-sectional shape, and the forming at 535 may include forming the radius filler with the second radius filler die to produce a second region of the radius filler that defines a second cross-sectional shape that may be different from the first cross-sectional shape. Thus, methods 500 may include forming a single radius filler that includes and/or defines a plurality of different cross-sectional shapes by forming the pre-form with a plurality of different radius filler die.

When methods 500 include moving at 530, it is within the scope of the present disclosure that the moving may be performed concurrently with the extending at 505 and/or concurrently with the withdrawing at 525. Additionally or alternatively, the moving at 530 may be performed without ceasing the extending at 505 and/or without ceasing the withdrawing at 525. Thus, methods 500 may describe a continuous, or at least substantially continuous, process in which the pre-form is extended and the cross-sectional shape of the resultant radius filler is varied in real time during the extending at 505 and/or the withdrawing at 525. Additionally or alternatively, methods 500 also may describe a continuous, or at least substantially continuous, process which includes transitioning between producing the first region of the radius filler and producing the second region of the radius filler without ceasing the extending at 505 and/or the withdrawing at 525.

Producing the continuous length of composite material that includes the unprocessed region, the intermediate region, and the formed region at 540 may include producing a single composite structure. The single composite structure may include the plurality of distinct and/or separate lengths of composite tape in the unprocessed region, the pre-form in the intermediate region, and the radius filler in the formed region. A first transition region, which may be defined by the pre-form forming apparatus, may produce a transition between the plurality of distinct lengths of composite tape and the pre-form, which includes the plurality of lengths of composite tape therein. Similarly, a second transition region, which may be defined by the radius filler forming apparatus, may produce a transition between the pre-form and the radius filler, which may be formed from the pre-form.

Illustrative, non-exclusive examples of inventive subject matter according to the present disclosure are described in the following enumerated paragraphs:

A1. A method of creating a pre-form for a radius filler, the method comprising: optionally extending a plurality of lengths of composite tape;

receiving the plurality of lengths of composite tape with a pre-forming structure, wherein the receiving includes drawing the plurality of lengths of composite tape through a plurality of first openings on a first side of the pre-forming structure;

combining the plurality of lengths of composite tape within the pre-forming structure to form the pre-form; and withdrawing the pre-form from the pre-forming structure, wherein the withdrawing includes extending the pre-form from a second opening on a second side of the pre-forming structure, and further wherein the receiving, the combining, and the withdrawing are performed concurrently.

A2. The method of paragraph A1, wherein the method further includes selectively varying at least one of a width, a relative orientation, a material of construction, and an orientation of at least one of the plurality of lengths of composite tape based, at least in part, on at least one of a desired cross-sectional area of the radius filler that is formed from the pre-form, a desired cross-sectional shape of the radius filler that is formed from the pre-form, and a desired mechanical stiffness of the radius filler that is formed from the pre-form.

A3. The method of any of paragraphs A1-A2, wherein the plurality of lengths of composite tape includes a number of lengths of composite tape, and further wherein the method includes selectively varying the number of lengths of composite tape.

A4. The method of paragraph A3, wherein the selectively varying includes selectively increasing the number of lengths of composite tape to at least one of increase a cross-sectional area of the radius filler that is formed from the pre-form and change a mechanical stiffness of the radius filler that is formed from the pre-form.

A5. The method of any of paragraphs A3-A4, wherein the selectively varying includes selectively decreasing the number of lengths of composite tape to at least one of decrease a/the cross-sectional area of the radius filler that is formed from the pre-form and change a/the mechanical stiffness of the radius fill that is formed from the pre-form.

A6. The method of any of paragraphs A2-A5, wherein the selectively varying is concurrent with at least two, optionally at least three, and optionally all of the extending, the receiving, the combining, and the withdrawing.

A7. The method of any of paragraphs A1-A6, wherein the combining includes arranging at least a first portion, or length of composite tape, of the plurality of lengths of composite tape such that it is oriented in a plane that is not parallel to a second portion, or length of composite tape, of the plurality of lengths of composite tape.

A8. The method of any of paragraphs A1-A7, wherein the combining includes arranging a selected length of composite tape of the plurality of lengths of composite tape such that it is oriented at a skew angle with respect to at least a portion of a remainder of the plurality of lengths of composite tape.

A9. The method of any of paragraphs A1-A8, wherein the combining includes converging the plurality of lengths of composite tape to form the pre-form, and optionally wherein the converging includes converging the plurality of lengths of composite tape within at least one of the pre-forming structure and a pre-form die.

A10. The method of any of paragraphs A1-A9, wherein the combining includes contacting a first length of composite tape of the plurality of lengths of composite tape with a second length of composite tape of the plurality of lengths of composite tape, and optionally wherein the contacting includes contacting the first length of composite tape with the second length of composite tape within at least one of a/the pre-forming structure and a/the pre-form die.

A11. The method of any of paragraphs A1-A10, wherein the pre-form defines a transverse cross-sectional shape, optionally wherein the transverse cross-sectional shape includes at least one of a triangular transverse cross-sectional shape, a wedge-shaped transverse cross-sectional shape, and a transverse cross-section that defines a base and a plurality of convergingly angled sides, and further optionally wherein the combining includes forming the plurality of lengths of composite tape into the transverse cross-sectional shape.

A12. The method of any of paragraphs A1-A11, wherein the extending includes at least one of pulling, pushing, and propelling the plurality of lengths of composite tape.

A13. The method of any of paragraphs A1-A12, wherein the extending includes extending the plurality of lengths of composite tape from a composite tape source, and optionally wherein the composite tape source includes at least one of a plurality of composite tape sources, a roll of composite tape, and a plurality of rolls of composite tape.

A14. The method of any of paragraphs A1-A13, wherein each of the plurality of lengths of composite tape includes a reinforcing fiber matrix and a resin material.

A15. The method of any of paragraphs A1-A14, wherein the pre-form includes the pre-form of any of paragraphs C1-C17.

A16. The method of any of paragraphs A1-A15, wherein the pre-forming structure includes the pre-form die of any of paragraphs D1-D9.

B1. A method of creating a radius filler, the method comprising: extending a pre-form along a pre-form supply path that extends through a radius filler die; and forming the radius filler within the radius filler die.

B2. The method of paragraph B1, wherein the forming includes receiving the pre-form at a first side of the radius filler die and withdrawing the radius filler from a second side of the radius filler die, optionally wherein the withdrawing is concurrent with the receiving.

B3. The method of any of paragraphs B1-B2, wherein the radius filler die is a first radius filler die, wherein the forming includes forming the radius filler within the first radius filler die to produce a first region of the radius filler with a first cross-sectional shape, and further wherein the method includes:
moving the first radius filler die out of the pre-form supply path;
moving a second radius filler die into the pre-form supply path; and
forming the radius filler with the second radius filler die to produce a second region of the radius filler with a second cross-sectional shape, optionally wherein the first cross-sectional shape is different from the second cross-sectional shape.

B4. The method of paragraph B3, wherein forming the radius filler within the second radius filler die includes receiving the pre-form at a first side of the second radius filler die and withdrawing the radius filler from a second side of the second radius filler die, optionally wherein the withdrawing is concurrent with the receiving.

B5. The method of any of paragraphs B3-B4, wherein the moving is at least one of concurrent with the extending and performed without ceasing the extending.

B6. The method of any of paragraphs B3-B5, wherein the moving includes transitioning between producing the first region and producing the second region without ceasing the extending.

B7. The method of any of paragraphs B3-B6, wherein the method further includes withdrawing the radius filler from a forming region that includes the first radius filler die and the second radius filler die, and optionally wherein the moving is concurrent with the withdrawing.

B8. The method of any of paragraphs B1-B7, wherein the forming includes at least one of compacting the pre-form, removing a void from the pre-form, shaping the pre-form, removing an air pocket from the pre-form, and changing a shape of the pre-form, optionally wherein a transverse cross-sectional shape of the pre-form is different from a transverse cross-sectional shape of the radius filler, and further optionally wherein a transverse cross-sectional area of the pre-form is greater than a transverse cross-sectional area of the radius filler.

B9. The method of any of paragraphs B1-B8, wherein the method further includes withdrawing the radius filler from a forming region that includes at least one of the radius filler die, a/the first radius filler die and a/the second radius filler die, wherein the withdrawing is concurrent with the extending.

B10. The method of any of paragraphs B1-B9, wherein the method further includes heating the pre-form, optionally wherein the heating includes at least one of heating the pre-form prior to the forming, heating the pre-form during the forming, supplying radiant heat to the pre-form, and heating the radius filler die.

B11. The method of any of paragraphs B1-B10, wherein the extending includes at least one of pulling, pushing, and propelling the pre-form.

B12. The method of any of paragraphs B1-B11, wherein the extending includes extending the pre-form from a pre-form forming apparatus.

B13. The method of any of paragraphs B1-B12, wherein the method further includes creating the pre-form, optionally using the method of any of paragraphs A1-A16.

B14. The method of paragraph B13, wherein the method includes producing a continuous length of composite material that includes an unprocessed region, an intermediate region, and a formed region, wherein the unprocessed region includes a/the plurality of lengths of composite tape, wherein the intermediate region includes the pre-form, and further wherein the formed region includes the radius filler.

B15. The method of any of paragraphs B1-B13, wherein the pre-form includes the pre-form of any of paragraphs C1-C17.

C1. A pre-form that is configured to be formed into a radius filler, the pre-form comprising:

a plurality of lengths of composite tape, wherein at least a selected length of composite tape of the plurality of lengths of composite tape is arranged at a skew angle with respect to at least a portion of a remainder of the plurality of lengths of composite tape.

C2. The pre-form of paragraph C1, wherein the selected length of composite tape is a first length of composite tape, wherein the skew angle is a first skew angle, and further wherein the pre-form includes a second length of composite tape that is arranged at a second skew angle with respect to the first length of composite tape and the portion of the remainder of the plurality of lengths of composite tape.

C3. The pre-form of any of paragraphs C1-C2, wherein skew angle is at least 5 degrees, at least 10 degrees, at least 15 degrees, at least 20 degrees, at least 25 degrees, at least 30 degrees, at least 35 degrees, at least 40 degrees, or at least 45 degrees.

C4. The pre-form of any of paragraphs C1-C3, wherein the skew angle is less than 90 degrees, less than 85 degrees, less than 80 degrees, less than 75 degrees, less than 70 degrees, less than 65 degrees, less than 60 degrees, less than 55 degrees, less than 50 degrees, or less than 40 degrees.

C5. The pre-form of any of paragraphs C1-C4, wherein the skew angle is measured in a transverse cross-section of the pre-form.

C6. The pre-form of any of paragraphs C1-C5, wherein the pre-form defines a transverse cross-sectional shape, and optionally wherein the transverse cross-sectional shape includes at least one of a triangular transverse cross-sectional shape, a wedge-shaped transverse cross-sectional shape, and a transverse cross-section that defines a base and a plurality of convergingly angled sides.

C7. The pre-form of any of paragraphs C1-C6, wherein the plurality of lengths of composite tape includes at least 2, at least 4, at least 6, at least 8, at least 10, at least 12, at least 14, at least 16, at least 18, at least 20, at least 25, or at least 30 lengths of composite tape.

C8. The pre-form of paragraph C7, wherein a number of lengths of composite tape that are included in the pre-form varies along a length of the pre-form.

C9. The pre-form of any of paragraphs C1-C8, wherein each of the plurality of lengths of composite tape defines a length and a width.

C10. The pre-form of paragraph C9, wherein the length of a portion of the plurality of lengths of composite tape is at least one of (i) at least 1 meter (m), at least 2 m, at least 3 m, at least 4 m, at least 5 m, at least 6 m, at least 7 m, at least 8 m, at least 9 m, at least 10 m, at least 15 m, or at least 20 m and (ii) less than 50 m, less than 40 m, less than 30 m, less than 25 m, less than 20 m, less than 15 m, less than 10 m, or less than 5 m.

C11. The pre-form of any of paragraphs C9-C10, wherein the width of a portion of the plurality of lengths of composite tape is at least one of (i) at least 3 millimeters (mm), at least 4 mm, at least 5 mm, at least 6 mm, at least 7 mm, at least 8 mm, at least 9 mm, at least 10 mm, at least 11 mm, at least 12 mm, at least 14 mm, at least 16 mm, at least 18 mm, at least 20 mm, or at least 24 mm and (ii) less than 50 mm, less than 45 mm, less than 40 mm, less than 35 mm, less than 30 mm, less than 25 mm, less than 20 mm, less than 18 mm, less than 16 mm, less than 14 mm, less than 12 mm, less than 10 mm, less than 8 mm, less than 6 mm, or less than 4 mm.

C12. The pre-form of any of paragraphs C10-C11, wherein the portion of the plurality of lengths of composite tape includes at least one of one length of composite tape, two lengths of composite tape, three lengths of composite tape, at least 25% of the plurality of lengths of composite tape, at least 50% of the plurality of composite tape, at least 75% of the plurality of lengths of composite tape, or 100% of the plurality of lengths of composite tape.

C13. The pre-form of any of paragraphs C1-C12, wherein each of the plurality of lengths of composite tape includes a reinforcing fiber matrix and a resin material.

C14. The pre-form of paragraph C13, wherein the reinforcing fiber matrix includes a plurality of reinforcing fibers, and optionally wherein the plurality of reinforcing fibers are formed from at least one of carbon, titanium, aluminum, a glass, and a metal.

C15. The pre-form of paragraph C14, wherein a fiber longitudinal axis of each of the plurality of reinforcing fibers is substantially parallel to a fiber axis, wherein the radius filler defines a radius filler longitudinal axis, and optionally wherein the fiber axis is one of parallel to and oriented at a fiber angle with respect to the radius filler longitudinal axis, optionally wherein the fiber angle includes a fiber angle of at least one of (i) at least 5 degrees, at least 10 degrees, at least 15 degrees, at least 20 degrees, at least 25 degrees, at least 30 degrees, at least 35 degrees, at least 40 degrees, or at least 45 degrees and (ii) less than 85 degrees, less than 80 degrees, less than 75 degrees, less than 70 degrees, less than 65 degrees, less than 60 degrees, less than 55 degrees, less than 50 degrees, or less than 40 degrees.

C16. The pre-form of paragraph C14, wherein the plurality of reinforcing fibers form a 2-dimensional arrangement within at least a portion of the plurality of lengths of composite tape, and optionally wherein the 2-dimensional arrangement includes at least one of a mesh, a woven structure, a cloth, and a random array of reinforcing fibers.

C17. The pre-form of paragraph C14, wherein the plurality of reinforcing fibers form a 3-dimensional arrangement within at least a portion of the plurality of lengths of composite tape, and optionally wherein the 3-dimensional arrangement includes at least one of a mesh, a woven structure, a cloth, a random array of reinforcing fibers, and two or more 2-dimensional arrangements of reinforcing fibers that are stacked on top of one another.

C18. The pre-form of any of paragraphs C13-C17, wherein the resin material includes an epoxy.

C19. A radius filler formed from the pre-form of any of paragraphs C1-C18.

C20. A radius filler that includes the pre-form of any of paragraphs C1-C18.

C21. The radius filler of any of paragraphs C19-C20, wherein the radius filler does not include an outer adhesive coating.

C22. A composite structure including the radius filler of any of paragraphs C19-C21.

C23. An aircraft including the radius filler of any of paragraphs C19-C21 or the composite structure of paragraph C22.

D1. A pre-form die configured to form a pre-form for a radius filler, the pre-form die comprising:
a die body, wherein the die body includes a first side and a second side;
a plurality of first openings on the first side of the die body that are configured to receive a plurality of lengths of composite tape; and
a second opening on the second side of the die body, wherein the plurality of first openings converge into the second opening within the die body, and further wherein the pre-form is configured to be withdrawn from the second opening.

D2. The pre-form die of paragraph D1, wherein the first side is generally opposed to the second side.

D3. The pre-form die of any of paragraphs D1-D2, wherein the plurality of first openings converge into the second opening at a convergence angle, and optionally wherein the convergence angle includes at least one of a skew angle and an angle of less than 70 degrees, less than 65 degrees, less than 60 degrees, less than 55 degrees, less than 50 degrees, less than 45 degrees, less than 40 degrees, less than 35 degrees, less than 30 degrees, less than 25 degrees, less than 20 degrees, or less than 15 degrees.

D4. The pre-form die of any of paragraphs D1-D3, wherein the plurality of first openings includes at least 2, at least 4, at least 6, at least 8, at least 10, at least 12, at least 14, at least 16, at least 18, at least 20, at least 25, or at least 30 first openings.

D5. The pre-form die of any of paragraphs D1-D4, wherein the plurality of first openings define at least one of a plurality of rectangular openings, a plurality of rectilinear openings, and a plurality of linear openings.

D6. The pre-form die of any of paragraphs D1-D5, wherein each of the plurality of first openings defines a major opening axis that is parallel to a width of a respective first opening of the plurality of first openings, and further wherein a selected major opening axis of a selected first opening of the plurality of first openings is oriented at a skew angle with respect to a major opening axis of another first opening of the plurality of first openings.

D7. The pre-form die of any of paragraphs D1-D6, wherein the second opening defines a second opening shape, and optionally wherein the second opening shape includes at least one of a triangular shape, a wedge shape, and a shape that defines a base and a plurality of convergingly angled sides.

D8. The pre-form die of any of paragraphs D1-D7, wherein the die body is formed from at least one of a polymeric material, a resin material, a polymeric resin, and an epoxy.

D9. The pre-form die of any of paragraphs D1-D8, wherein the plurality of first openings and the second opening is formed by at least one of machining, photolithography, and 3-dimensional printing.

E1. An apparatus configured to form a pre-form for a radius filler, the apparatus comprising: a composite tape source that is configured to provide a plurality of lengths of composite tape;
a pre-forming structure that is configured to receive the plurality of lengths of composite tape and to converge the plurality of lengths of composite tape to produce the pre-form; and
a drive mechanism that is configured to convey the plurality of lengths of composite tape between the composite tape source and the pre-forming structure.

E2. The apparatus of paragraph E1, wherein the apparatus further includes a composite tape selection structure that is configured to selectively supply the plurality of lengths of composite tape to the pre-forming structure.

E3. The apparatus of paragraph E2, wherein the plurality of lengths of composite tape includes a number of lengths of composite tape, and further wherein the composite tape selection structure is configured to, and optionally includes a controller that is programmed to, at least one of selectively increase the number of lengths of composite tape, selectively decrease the number of lengths of composite tape, and selectively change a composition of at least one of the plurality of lengths of composite tape responsive to a selection criteria.

E4. The apparatus of paragraph E3, wherein the selection criteria includes at least one of a desired cross-sectional area for the radius filler that is formed from the pre-form, a desired cross-sectional shape for the radius filler that is formed from the pre-form, a desired mechanical stiffness of the radius filler that is formed from the pre-form, and a shape of a radius filler die that is utilized to form the radius filler.

E5. The apparatus of any of paragraphs E1-E4, wherein the composite tape source includes at least one of a plurality of composite tape sources and a plurality of composite tape dispensers.

E6. The apparatus of any of paragraphs E1-E5, wherein the composite tape source includes a plurality of rolls of composite tape.

E7. The apparatus of any of paragraphs E1-E6, wherein the pre-forming structure includes the pre-form die of any of paragraphs D1-D9.

E8. The apparatus of any of paragraphs E1-E7, wherein the apparatus includes the pre-form, and optionally wherein the pre-form includes the pre-form of any of paragraphs C1-C18.

E9. The apparatus of any of paragraphs E1-E8, wherein the pre-form is formed using the method of any of paragraphs A1-A16.

E10. The apparatus of any of paragraphs E1-E9, wherein the apparatus further includes a controller, and optionally wherein the controller is programmed to control operation of the apparatus using the method of any of paragraphs A1-A16.

F1. An apparatus that is configured to form a radius filler, the apparatus comprising:
a pre-form supply that is configured to supply a pre-form along a pre-form supply path; and
a radius filler die located within the pre-form supply path, wherein the radius filler die is configured to receive the pre-form and to produce the radius filler therefrom.

F2. The apparatus of paragraph F1, wherein the radius filler die is a first radius filler die that is configured to be selectively located within the pre-form supply path, to receive the pre-form, and to produce a first region of the radius filler with a first cross-sectional shape therefrom, and further wherein the apparatus includes:

a second radius filler die that is configured to be selectively located within the pre-form supply path, to receive the pre-form, and to produce a second region of the radius filler with a second cross-sectional shape therefrom; and a die selection structure that is configured to selectively locate the first radius filler die within the pre-form supply path to produce the first region and to selectively locate the second radius filler die within the pre-form supply path to produce the second region.

F3. The apparatus of any of paragraphs F1-F2, wherein the apparatus further includes a pre-heater that is configured to pre-heat the pre-form prior to the pre-form being received by the radius filler die, and optionally wherein the pre-heater includes an infrared lamp.

F4. The apparatus of any of paragraphs F1-F3, wherein the apparatus further includes a die heater that is configured to heat at least one of the radius filler die, a/the first radius filler die, and a/the second radius filler die.

F5. The apparatus of any of paragraphs F1-F4, wherein the apparatus is configured to form the radius filler using the method of any of paragraphs B1-B15.

F6. The apparatus of any of paragraphs F1-F5, wherein the apparatus further includes a controller, and optionally wherein the controller is programmed to control operation of the apparatus using the method of any of paragraphs B1-B15.

F7. The apparatus of any of paragraphs F1-F6, wherein the apparatus includes the pre-form, and optionally wherein the pre-form includes the pre-form of any of paragraphs C1-C18.

F8. The apparatus of any of paragraphs F1-F7, wherein the pre-form supply includes the apparatus of any of paragraphs E1-E10.

G1. The use of any of the methods of any of paragraphs A1-B15 with any of the pre-forms of any of paragraphs C1-C18, any of the radius fillers of any of paragraphs C19-C21, the composite structure of paragraph C22, the aircraft of paragraph C23, the pre-form die of any of paragraphs D1-D9, or the apparatus of any of paragraphs E1-F8.

G2. The use of any of the pre-forms of any of paragraphs C1-C18, any of the radius fillers of any of paragraphs C19-C21, the composite structure of paragraph C22, the aircraft of paragraph C23, the pre-form die of any of paragraphs D1-D9, or the apparatus of any of paragraphs E1-F8 with any of the methods of any of paragraphs A1-B15.

G3. The use of any of the methods of any of paragraphs A1-B15, any of the pre-forms of any of paragraphs C1-C18, any of the radius fillers of any of paragraphs C19-C21, the pre-form die of any of paragraphs D1-D9, or the apparatus of any of paragraphs E1-F8 to create a radius filler, a composite structure, or an aircraft.

G4. The use of a pre-form that includes a plurality of lengths of composite tape to form a radius filler, wherein at least a first portion of the plurality of lengths of composite tape is oriented at a skew angle with respect to a second portion of the plurality of lengths of composite tape.

G5. The use of a radius filler that includes a plurality of lengths of composite tape, wherein at least a first portion of the plurality of lengths of composite tape is oriented at a skew angel with respect to a second portion of the plurality of lengths of composite tape, to form a composite structure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An apparatus configured to form a pre-form for a radius filler, the apparatus comprising:

a composite tape source that is configured to provide a plurality of lengths of composite tape;

a pre-forming structure that is configured to receive the plurality of lengths of composite tape and to converge the plurality of lengths of composite tape to produce the pre-form, wherein the pre-forming structure includes a pre-form die, wherein the pre-form die includes:

(i) a die body, wherein the die body includes a first side and a second side;

(ii) a plurality of first openings on the first side of the die body configured to receive the plurality of lengths of composite tape, wherein each first opening of the plurality of first openings defines a major opening axis that is parallel to a width of a respective first opening of the plurality of first openings, and further wherein a selected major opening axis of a selected first opening of the plurality of first openings is oriented at a skew angle with respect to another major opening axis of another first opening of the plurality of first openings; and (iii) a second opening on the second side of the die body, wherein the plurality of first openings converges into the second opening within the die body, and further wherein the pre-form is configured to be withdrawn from the second opening; and a drive mechanism that is configured to convey the plurality of lengths of composite tape between the composite tape source and the pre-forming structure.

2. The apparatus of claim 1, wherein the apparatus further includes a composite tape selection structure that is configured to selectively supply the plurality of lengths of composite tape to the pre-forming structure.

3. The apparatus of claim 2, wherein the plurality of lengths of composite tape includes a number of lengths of composite tape, and further wherein the composite tape selection structure is configured to at least one of:
(i) selectively increase the number of lengths of composite tape responsive to a selection criteria; and
(ii) selectively decrease the number of lengths of composite tape responsive to the selection criteria;
wherein the selection criteria includes at least one of a desired cross-sectional area for the radius filler that is formed from the pre-form, a desired cross-sectional shape for the radius filler that is formed from the pre-form, a desired mechanical stiffness of the radius filler that is formed from the pre-form, and a shape of a radius filler die that is utilized to form the radius filler.

4. The apparatus of claim 1, wherein the plurality of first openings converges into the second opening within the die body at the skew angle.

5. The apparatus of claim 1, wherein the plurality of first openings converges into the second opening within the die body such that each length of composite tape in the plurality of lengths of composite tape is compressed against at least one other length of composite tape in the plurality of lengths of composite tape within the die body.

6. The apparatus of claim 1, wherein the plurality of first openings converges into the second opening within the die body such that each length of composite tape in the plurality of lengths of composite tape directly contacts at least one other length of composite tape in the plurality of lengths of composite tape within the die body.

7. The apparatus of claim 1, wherein the apparatus further includes the plurality of lengths of composite tape, wherein each length of composite tape in the plurality of lengths of composite tape extends from the composite tape source and into a corresponding first opening of the plurality of first openings, wherein the lengths of composite tape of the plurality of lengths of composite tape directly contact and compress against one another within the die body, wherein the apparatus includes the pre-form, and further wherein the pre-form extends from the second opening.

8. The apparatus of claim 7, wherein at least a selected length of composite tape of the plurality of lengths of composite tape is arranged at a skew angle with respect to at least a portion of a remainder of the plurality of lengths of composite tape as measured within a transverse cross-section of the pre-form.

9. The apparatus of claim 1, wherein the first side is opposed to the second side.

10. The apparatus of claim 1, wherein the plurality of first openings includes at least one of a plurality of rectangular openings and a plurality of rectilinear openings.

11. An apparatus that is configured to form a radius filler, the apparatus comprising:
a pre-form supply that is configured to supply a pre-form along a pre-form supply path, wherein the pre-form supply includes the apparatus of claim 1; and
a radius filler die located within the pre-form supply path, wherein the radius filler die is configured to receive the pre-form and to produce the radius filler therefrom.

12. The apparatus of claim 11, wherein the radius filler die is a first radius filler die, wherein the first radius filler die is configured to produce a first region of the radius filler with a first cross-sectional shape from the pre-form, and further wherein the apparatus includes a second radius filler die that is configured to be selectively located within the pre-form supply path, to receive the pre-form, and to produce a second region of the radius filler with a second cross-sectional shape, which is different from the first cross-sectional shape.

13. The apparatus of claim 12, wherein the apparatus further includes a pre-heater that is configured to pre-heat the pre-form prior to the pre-form being received by either of the first radius filler die and the second radius filler die.

14. The apparatus of claim 12, wherein the apparatus further includes a die heater that is configured to heat at least one of the first radius filler die and the second radius filler die.

15. The apparatus of claim 1, wherein the composite tape source includes at least one of a plurality of composite tape sources and a plurality of composite tape dispensers.

16. The apparatus of claim 1, wherein the composite tape source includes a plurality of rolls of composite tape.

17. The apparatus of claim 1, wherein the drive mechanism includes at least one of a motor, a roller, a squeeze roller assembly, and a conveyor.

18. The apparatus of claim 1, wherein the apparatus includes the pre-form.

19. The apparatus of claim 18, wherein the pre-form includes the plurality of lengths of composite tape, wherein at least a selected length of composite tape of the plurality of lengths of composite tape is arranged at a skew angle with respect to at least a portion of a remainder of the plurality of lengths of composite tape.

20. The apparatus of claim 19, wherein the selected length of composite tape is a first length of composite tape, wherein the skew angle is a first skew angle, and further wherein the pre-form includes a second length of composite tape that is arranged at a second skew angle with respect to the first length of composite tape and the portion of the remainder of the plurality of lengths of composite tape.

* * * * *